United States Patent [19]

Koziol

[11] 4,267,816
[45] May 19, 1981

[54] UNIVERSAL BURNER ELEMENT FOR A GAS BARBECUE GRILL

[76] Inventor: Walter Koziol, Box 97, Russell, Ill. 60075

[21] Appl. No.: 940,215

[22] Filed: Sep. 7, 1978

[51] Int. Cl.³ .......................... A47J 37/00; F23Q 9/00; F16M 11/38
[52] U.S. Cl. .................................. 126/41 R; 431/278; 248/168
[58] Field of Search .......................... 126/41 R, 39 E; 248/168, 188.2; 403/262; 5/118; 431/278

[56] References Cited

U.S. PATENT DOCUMENTS

| | | | |
|---|---|---|---|
| 3,210,034 | 10/1965 | Bonanno | 248/168 |
| 3,357,666 | 12/1967 | Smith et al. | 248/168 |
| 3,544,139 | 12/1970 | Sharples | 403/262 |
| 3,638,635 | 2/1972 | Drennan | 126/41 R |
| 3,722,011 | 3/1973 | Miller | 248/188.2 |

FOREIGN PATENT DOCUMENTS

1000423  10/1951  France ................................ 403/262

Primary Examiner—Samuel Scott
Assistant Examiner—Wesley S. Ratliff, Jr.
Attorney, Agent, or Firm—Neil E. Hamilton

[57] ABSTRACT

A gas burner element for a barbecue grill which can be utilized in a wide variety of barbecue grill base portions. The burner element has leg members which extend from the element in the direction of the base floor so that the burner element is supported solidly above the floor and the gas intake member is in communication with the gas supply pipe irrespective of the placement of the foot pads on the floor. In a preferred manner, the leg members are pivotally and extendably attached to the burner element.

13 Claims, 7 Drawing Figures

UNIVERSAL BURNER ELEMENT FOR A GAS BARBECUE GRILL

BACKGROUND OF THE INVENTION

This invention relates to a burner element for a barbecue gas grill and more particularly to a gas burner element wherein leg members support the burner element above the floor of the base portion with the burner element solidly supported from the floor irrespective of the placement of the foot pad supports on the floor and in a communication with the gas supply pipe.

Various barbecue grill bases have floors with foot pads for the burner element located at various positions on the floor. Accordingly, it is necessary to construct each burner element to match the particular location of the foot pad support so that the burner element is solidly supported therein and have the gas intake member in communication with the gas supply pipe. Cost savings could be effected if one burner element is fabricated so as to fit in a stable manner in any barbecue base portion and in an operative manner.

It is an object of the present invention to provide a burner element for a barbecue gas grill which can operatively fit numerous gas grill base floors. It is another object of this invention to provide a burner element with leg members which can be positioned on foot pads located at various positions on the floor of the gas grill. It is still another object of this invention to provide leg members for a gas burner element wherein the legs are pivotally and extendably attached to the burner hollow body. It is yet another object of the present invention to provide a universal gas burner for a gas grill which can be manufactured in an economical manner. It is still another object of this invention to provide an adjustable and telescoping gas intake tube assembly for a gas grill.

SUMMARY OF THE INVENTION

The foregoing objects are accomplished by the present burner element and the improved barbecue gas grill wherein the burner element is defined by a hollow body member having a central portion and at least two projecting arm portions. A plurality of apertures are distributed over the body member and an intake member is disposed in fluid communication with the hollow body member and extends from the hollow body in a given direction. A leg member extends from each arm portion and in a direction generally the same as the intake member. The leg member rests against the floor of the grill and supports the burner in a solid manner with the gas intake member in fluid communication with the gas intake pipe irrespective of the location of the foot pads on the floor. In a preferred manner the leg member is pivotally attached as well as extendable from the body member of the burner and transverse to the intake member to provide further adjustment.

BRIEF DESCRIPTION OF DRAWINGS

A better understanding of the present burner element will be accomplished by reference to the drawing wherein.

DESCRIPTION OF THE PREFERRED EMBODIMENT

Figure 2:
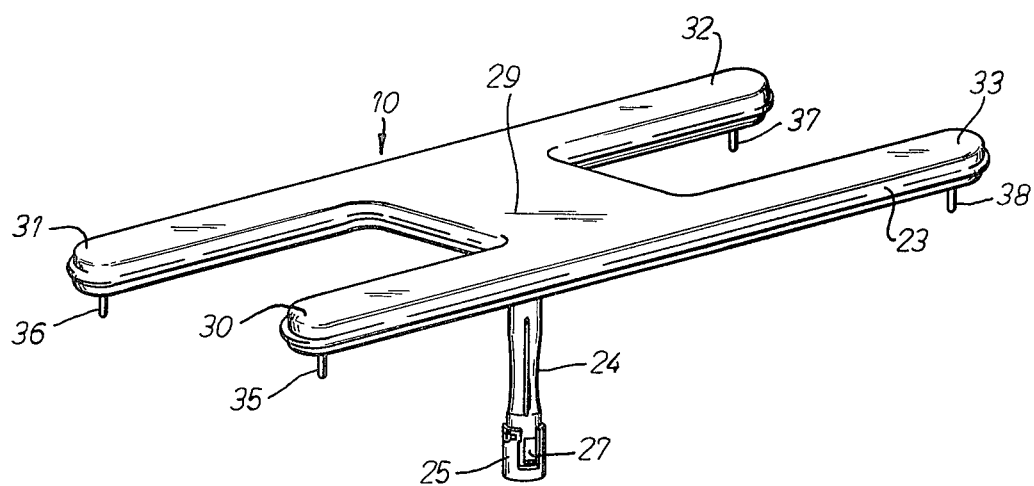
FIG. 2 is a perspective view of the burner element of this invention.
Figure 1:
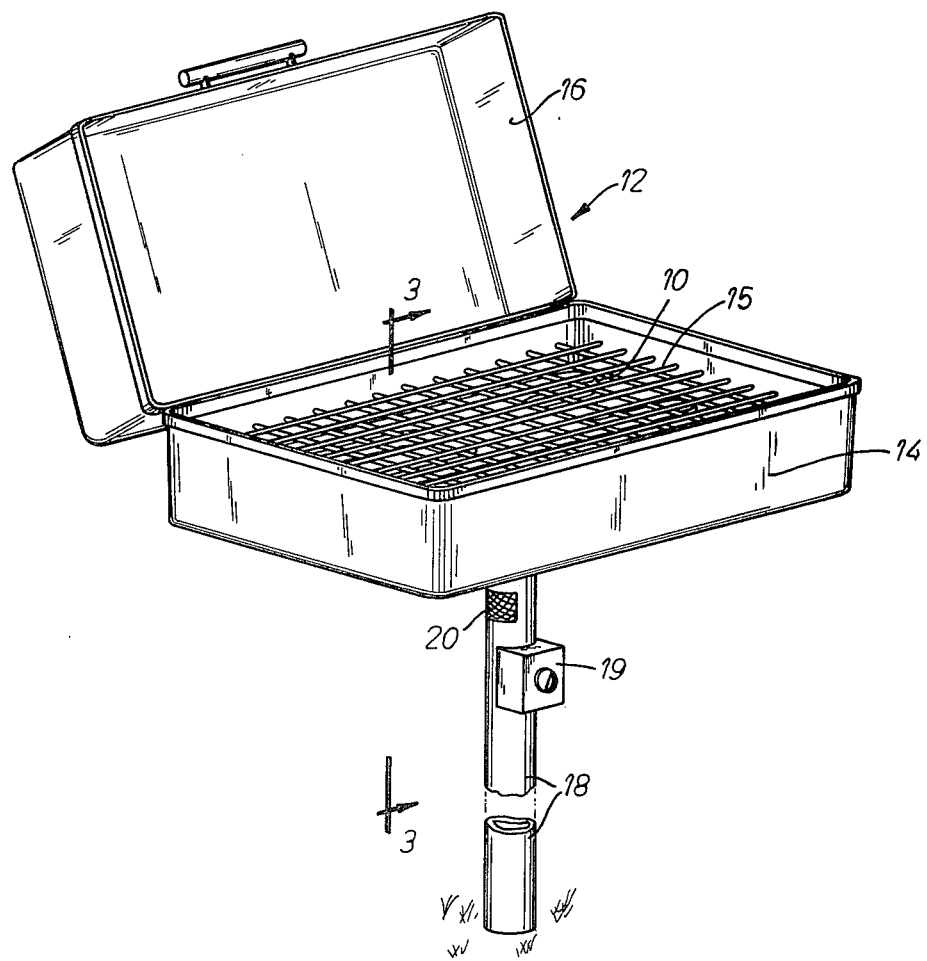
FIG. 1 is a perspective view of a grill unit, the type of which the burner element of this invention is fabricated to be used in conjunction therewith.

Proceeding to a detailed description of the present invention, the gas element generally 10 is shown specifically in FIG. 2 and is utilized in conjunction with the gas grill unit generally 12, as shown in FIG. 1. Grill unit 12 has the usual base member 14 with a grate 15 and cover 16. Base 14 is supported by the normal post 18 carrying a gas control 19 and having an air vent 20.

As best shown in FIG. 2, burner element 10 defines a hollow body member 23 communicating with a gas intake venturi tube or intake pipe 24. A rotatable air regulator 25 is slidably disposed at the end of the intake conduit which adjusts opening 27. It will be noted that burner element 10 is formed from a central portion 29 with four arm portions 30, 31, 32 and 33 projecting thereform, resulting in an H-shaped configuration. Extending from each arm portion is a leg member 35, 36, 37 and 38, respectively, which is positioned near the end of the arm portions and in the direction of venturi tube 24. Leg members 35-38 are pivotally and extendably secured to the bottom of arm portions 30-33 and will contact the foot pads such as 41 and 42 on floor 40 of base member 14, as will best be seen in FIG. 3.

Figure 4:
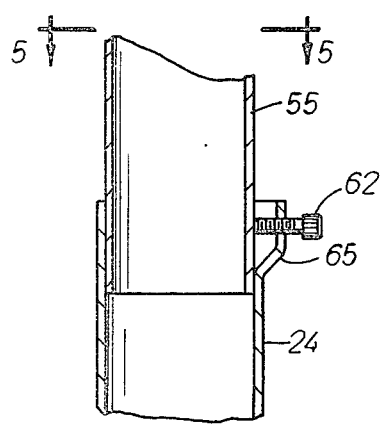
FIG. 4 is a partial view in vertical section illustrating the gas intake member in communication with the gas venturi tube and the means for securing the gas intake member therein.
Figure 5:
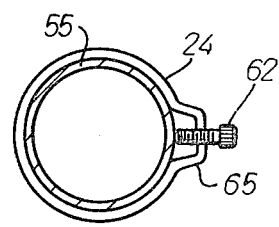
FIG. 5 is a view taken along line 5-5 of FIG. 4.

Burner element 10 has a plurality of apertures 53 distributed over the bottom section thereof. It will be seen that burner element 10 includes an intake member 55 in fluid communication with venturi tube 24 which is positioned on control 19 by means of air regulator 25. A gas supply nozzle 57, fed by gas supply line 60, is centered in intake pipe 24. Gas intake member 55 is adjustably positioned in intake pipe 24 by means of a threaded screw 62 threadably supported in U-shaped extension 65 of tube 24. This is best seen in FIGS. 4 and 5.

Figure 6:
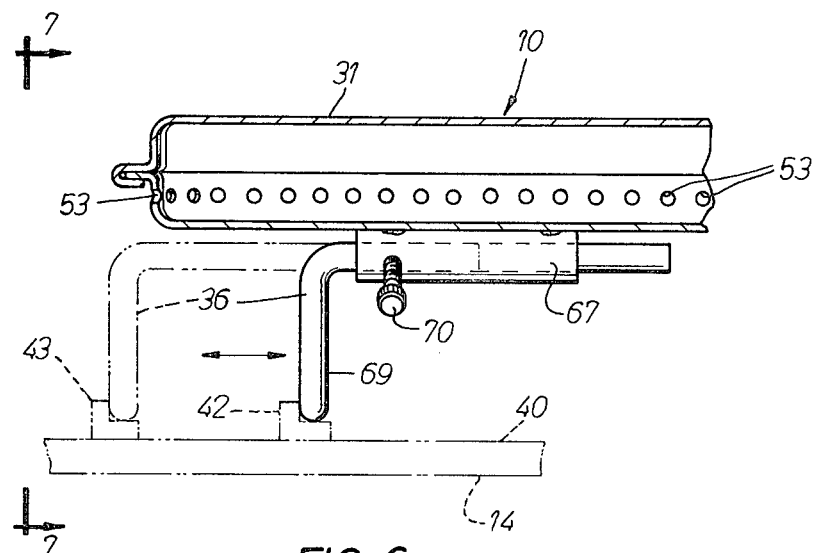
FIG. 6 is a view taken along line 6-6 of FIG. 3.
Figure 7:
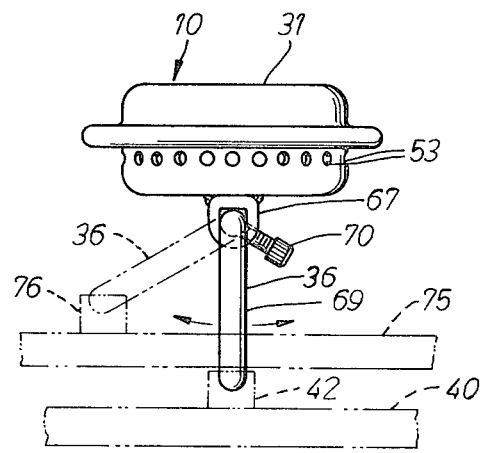
FIG. 7 is a view taken along line 7-7 of FIG 6.

Referring to FIGS. 6 and 7, it will be noted that arm portion 31 of burner 10 is provided with a tubular portion 67 to accommodate leg member 36 in an extendable and rotatable manner. All leg members including 36 are formed from a right-angled rod 69 which is slidably secured in tubular portion 67 by means of a threaded screw 70 threadably received in tubular portion 67. This permits extension or retraction in a transverse direction with respect to venturi tube 24, and placement on foot pad 42 or adjustment to pad 43 on floor 40. As specifically illustrated in FIG. 7, the pivotal action of leg member 36 permits it to be positioned easily on floor 40 or laterally on another pad 76 on floor 75.

Figure 3:
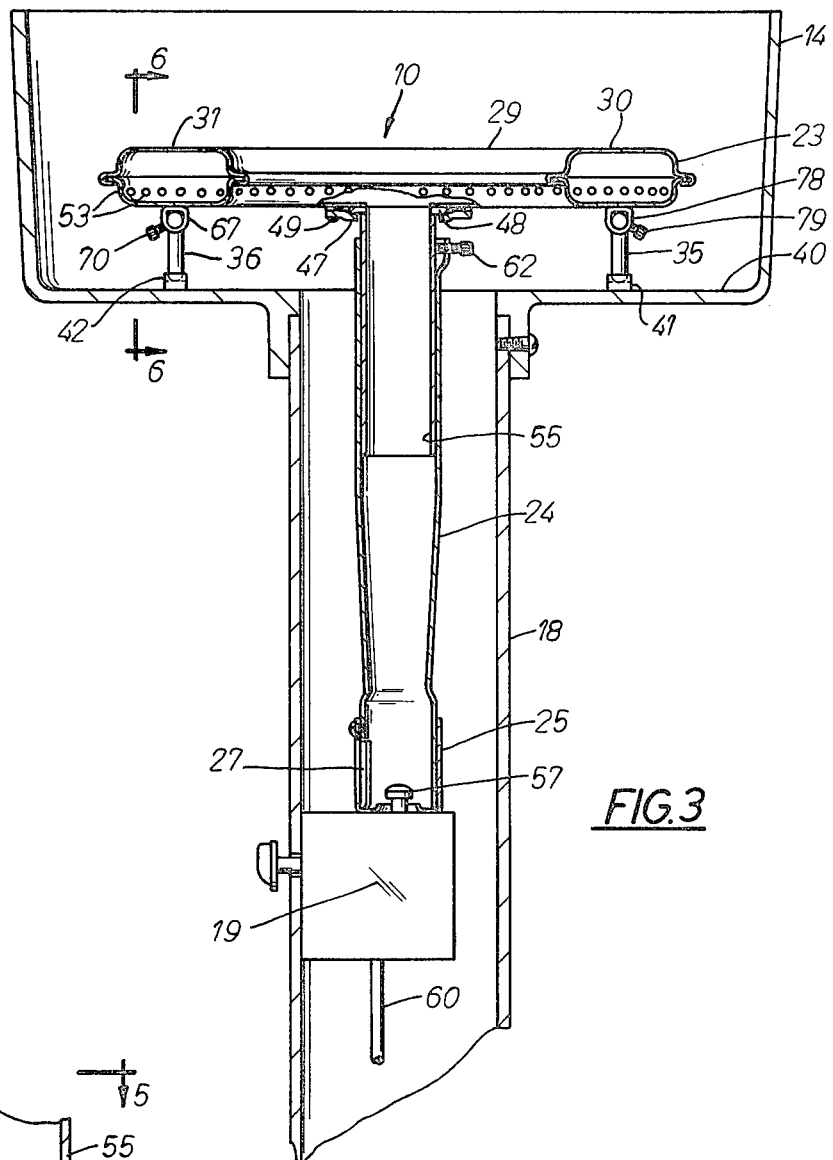
FIG. 3 is a view taken along line 3-3 of FIG. 1.

It will be noted in conjunction with FIG. 3 that each leg such as illustrated at 35 will also be pivotally and extendably attached to arm portions such as 30 by means of tubular portion 78 and secured by screw 79. Accordingly, all four arms 30-33 have pivotally and extendable leg members.

An important aspect of this invention is the fact that leg members 35-38 can be adjustable to foot pads on the grill floor irrespective of their location. Adjustment of the burner intake member 55 is readily accomplished by a threaded screw 62 in intake pipe 24 so as to permit intake conduit 55 to telescope in and contact intake venturi pipe 24 irrespective of the distance the burner 10 is positioned above the floor 40 with the condition that conduit 55 be of sufficient length to be received in pipe 24. It will be noted that intake conduit 55 is secured to burner 10 by means of a slidable collar 47 retained on conduit 55 by projections 48 and secured by screws 49. As best seen in FIGS. 6 and 7, burner element 10 offers the advantage of incremental adjustment in a lateral and longitudinal manner with respect to the axis of an arm portion so that if a floor should have support pads which are placed in various positions, the leg members such as 35 and 36 can easily contact the floor with intake conduit 55 received in venturi pipe 24 and the burner element 10 maintained in a parallel manner with respect to the grill grate.

Gas-fired grill 12 is made of cast aluminum whereas the burner element 10 is manufactured from steel. Venturi tube 24 and intake conduit 55 are also made from steel and usually chrome-plated. Tubular members 67 and 78 are made of stainless steel and are secured to burner 10 by welding or fabricating as part of the burner. Legs 35–38 are in the form of right-angled bars and are made from stainless steel or cold rolled bar stock. Screws 70, 79 and 62 are of the machine type.

While burner 10 is preferably in the form of an "H", it will be appreciated that the leg members could be utilized with any configuration of burner whether of a straight tube, star-shaped or "figure 8" variety. Further, while intake conduit 55 is shown telescoping inside venturi tube 24, it could be placed outside thereof and fastening screw 62 threadably attached thereto.

It will thus be seen that through the present invention there is now provided a burner element which is fabricated to fit numerous types of barbecue grills irrespective of the foot pad placement on the floor. The same burner will maintain a parallel position with respect to the grate and with the intake conduit properly and securely positioned in the gas intake pipe in various types of gas grill constructions. Various adjustments can be made to properly position the burner legs on the floor foot pads and in a rigid manner.

The foregoing invention can now be practiced by those skilled in the art. Such skilled persons will know that the invention is not necessarily restricted to the particular embodiments presented herein. The scope of the invention is to be defined by terms of the following claims as given meaning by preceding description.

I claim:

1. A burner element for a gas barbecue grill comprising:
   a hollow body member defining a central portion and at least two extending arm portions;
   a plurality of apertures distributed over said body member;
   an intake member in fluid communication with said hollow body member and extending in a given direction;
   a leg member defined by a longitudinal and angular portion and longitudinally extendable from each said arm portion and in a direction generally transverse of said intake member; and means to adjustably secure said leg member in said arm portion in both a longitudinal and transverse manner.

2. The burner element as defined in claim 1 wherein said means to adjustably secure said leg member includes means to pivotally attach said leg members to said arm portion.

3. The burner element as defined in claim 2 wherein said means to pivotally attach said leg members to said arm portion includes a threaded screw member.

4. The burner element as defined in claim 3 wherein said leg members are defined by right-angled rods and said hollow body member includes tubular portions to accommodate portions of said rods.

5. The burner element as defined in claim 1 wherein said body member is an H-shaped configuration.

6. An improved barbecue gas grill comprising:
   a base member defining a floor portion with foot pads and a tubular gas supply pipe operatively associated with said base member;
   a burner element defining a hollow body member having a central portion and at least two extending arm portions;
   a plurality of apertures distributed over said body member;
   an intake member extending from said body member of said burner element and in telescoping relationship with said gas supply pipe of said base member;
   means to secure said intake member of said burner element in said supply pipe of said base member;
   a leg member defined by a longitudinal and angular portion and longitudinally extendable from each said arm portion and in contact with said foot pads on said floor portion of said base member; and
   means to adjustably secure said leg member in said arm portion in both a longitudinal and transverse manner.

7. The improved barbecue gas grill as defined in claim 6 wherein said means to secure said intake member and gas supply pipe together is a thread screw.

8. The burner element as defined in claim 7 wherein said leg member is defined by a right-angled rod and said burner body member includes a tubular housing to pivotally accommodate a portion of said rod.

9. The burner element as defined in claim 8 further including a threaded screw member carried by said tubular housing for contacting a portion of said rod to prevent rotation.

10. An improved gas venturi tube comprising:
    a tubular member defining at least one lateral aperture;
    an air regulator member slidably received by said tubular member at one end thereof to controlably cover said lateral aperture;
    an opening defined by said regulator member for receiving a gas supply nozzle;
    a gas intake conduit in telescoping relationship with said tubular member; and
    securing means operatively associated with said tubular member and said intake conduit to adjustably secure said conduit and said tubular member in a fixed position.

11. The improved gas venturi tube as defined in claim 10 further including a collar member slidably received on said gas intake member.

12. The improved gas venturi tube as defined in claim 10 wherein said gas intake conduit telescopes inside said tubular member and said securing means is carried by said tubular member.

13. The improved gas venturi tube as defined in claim 10 wherein said securing means is a threaded screw threadably received by said tubular member or said intake conduit.

* * * * *

UNITED STATES PATENT AND TRADEMARK OFFICE
CERTIFICATE OF CORRECTION

PATENT NO. : 4,267,816

DATED : May 19, 1981

INVENTOR(S) : Walter Koziol

It is certified that error appears in the above—identified patent and that said Letters Patent is hereby corrected as shown below:

Claims 10-13 should be canceled.

On the Title page "13 claims" should read -- 9 claims --.

Signed and Sealed this

Seventeenth Day of November 1981

[SEAL]

Attest:

GERALD J. MOSSINGHOFF

Attesting Officer    Commissioner of Patents and Trademarks